No. 875,053. PATENTED DEC. 31, 1907.
C. E. DURYEA.
PNEUMATIC TIRE.
APPLICATION FILED APR. 8, 1907.
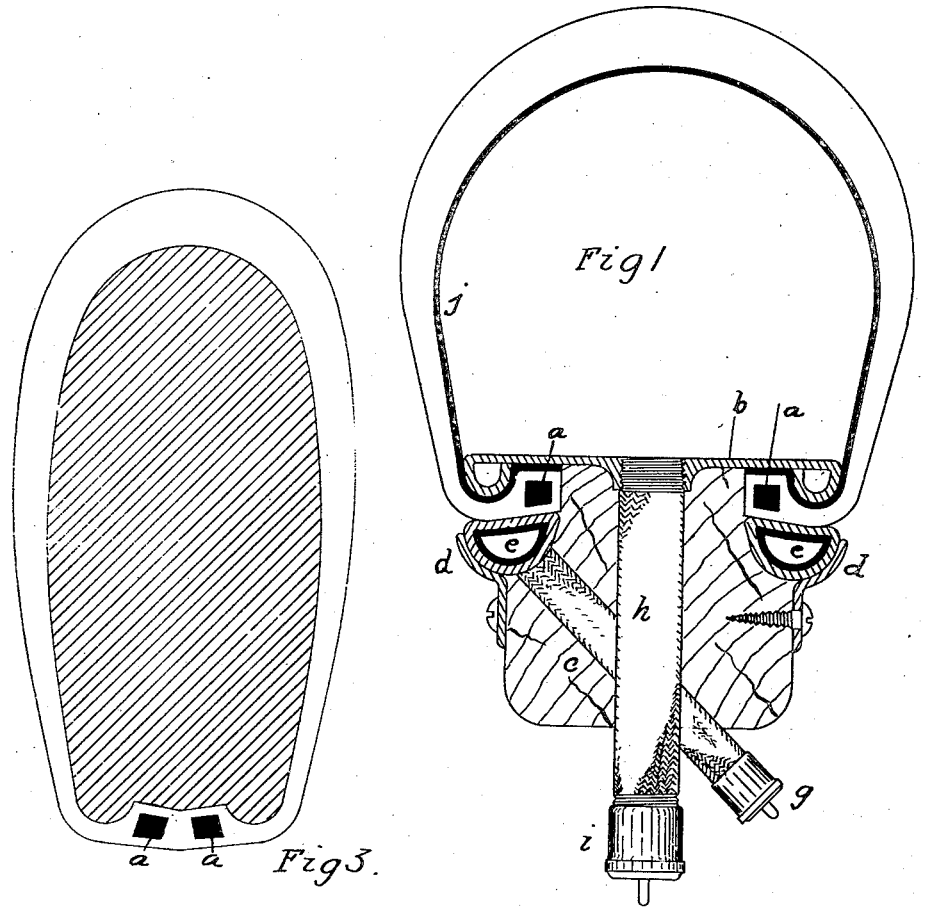
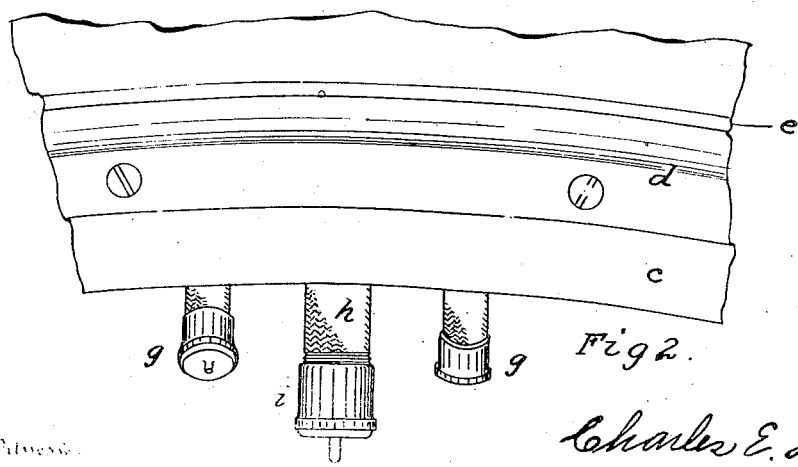
Witnesses:
M. A. Bond.
G. M. Copenhaver.
Inventor
Charles E. Duryea
By E. W. Bond
Attorney

UNITED STATES PATENT OFFICE.

CHARLES E. DURYEA, OF READING, PENNSYLVANIA.

PNEUMATIC TIRE.

No. 875,053.

Specification of Letters Patent.

Patented Dec. 31, 1907.

Application filed April 8, 1907. Serial No. 366,982.

*To all whom it may concern:*

Be it known that I, CHARLES E. DURYEA, a citizen of the United States, residing at Reading, in the county of Berks and State of Pennsylvania, have invented certain new and useful Improvements in Pneumatic Tires; and I do hereby declare the following to be a full, clear, and exact description of the invention, such as will enable others skilled in the art to which it appertains to make and use the same.

My invention relates to that class of pneumatic tires which are positively attached to the rim or felly of the vehicle regardless of whether or not the tire is inflated.

The objects of my invention are to provide a tire positively attached, quickly detachable, simple in construction, neat in appearance and possessing a number of other advantages as will be set forth in this specification.

I accomplish these objects by the construction shown in the accompanying drawings, in which Figure 1 is a cross section of tire and felly showing the flat metal rim, the inflatable and locking tubes and the construction and arrangements of the various parts; Fig. 2 is a side elevation of a part of tire and felly showing a suitable arrangement of tire valve and a locking tube valve; and Fig. 3 is a section of a metal ring on which the tire is molded in process of manufacture.

Similar letters refer to similar parts.

It is a well known fact that a pneumatic tire, if quite thick, rides hard because it lacks flexibility and receptiveness. To secure this flexibility and receptiveness the tire should be thin that it may bend easily and fully and that many bendings may not damage it. It is quite evident that a thin structure will bend more times than a thick structure, so assuming sufficient strength the thinner the structure the better from this point of view. It is also evident that a large portion of the value of a pneumatic tire is its ability to receive into itself more or less completely, the pebbles and inequalities of the road instead of lifting the wheel and load over each inequality as does a solid tire. Further the efficiency of a tire is largely dependent upon its ability to expand after rolling over obstacles with substantially the same amount of reaction that was expended in action in receiving the obstacle. Pneumatic tires differ widely in this respect, and the easy running live tire possesses a decided advantage over the stiff tire so this feature is also much sought. To secure these good points I prefer a thin tire mechanically or positively attached to the rim instead of a thick tire constrictively held against the rim as is the most common form. In the constrictive tire the fabric is strained lengthwise and resists deflection from a true circle strongly or if forcibly deflected the fabric is strained because, being already taut lengthwise, further elongation is liable to do damage. In my tire, I prefer leaving the fabric loose lengthwise the tire and therefore free to yield to accommodate road inequalities. Being thin, punctures are probably more frequent but the construction is such that repairs are quickly made, so this slight disadvantage can well be accepted for the sake of the advantages gained.

I construct the edges of my tire with L-shaped beads *a a* of which the inner corners are shaped to correspond with the inner part of the metal rim *b* against which these corners abut as shown in Fig. 1. These L-shaped edges are ordinarily stiffened by a filling of harder material in a well known manner. The metal rim *b* is preferably flat in cross section on its outer surface while its edges are shaped so as to form beads which stiffen it very materially as well as provide the abutment for the tire edges *a a*. This construction permits the metal rim *b* to be quite thin and therefore of light weight, but of sufficient strength, a thing much desired in auto and cycle service. The wood felly *c*, common in auto wheel construction is hollowed at its outer corners and provided along its sides with metal ring flanges *d d*, screwed or bolted firmly in position against the felly *c*. These flanges *d d* and the hollows of the wood felly *c*, combine to form recesses suitable to receive the L-shaped edges *a a*, of the tire, with additional semi-circular spaces into which the locking tubes *e e* fit. When in position these tubes are not cylindrical but are semi-circular, and upon inflation tend strongly to assume a circular shape but are prevented from doing so by their contact with the tire, with the result that they force the L shaped edges *a a* firmly into the spaces provided for them and prevent removal of these edges from the felly and rim, until the locking tubes *e e* are deflated. These tubes *e e* are inflated separately so one may be deflated and one edge of the tire removed without disturbing the other. The thickness of an edge *a* and the annular space between the ring flange *d* and the adjacent bead edge of the rim *b* are respectively such that the edge *a* may be removed through the said space without difficulty when the tube *e* is deflated. It is evident of course that when deflated the tube *e* contracts and is easily pushed into the semi-circular space formed by the flange and rim, and thus does not impede or interfere with the insertion or removal of the tire edge *a*. Further the stem of the tube *e* used for inflation purposes is set at such an angle through the felly *c* and is of such size and construction that it may be withdrawn through the annular space between the flange *d* and edge of rim *b*, without difficulty particularly after the cap *g* is removed.

The tubes *e e* are constructed of fabric so as to have ample strength to resist bursting at the slight unsupported space between the outer edge of the flange *d* and the tire as shown in Figs. 1 and 2. They are lined or fitted with an air retaining rubber, just as is a single tube tire and are preferably coated with sufficient rubber exteriorly to render them water and dust proof. When inflated they fit tightly both against the tire and flange and thus prevent entrance of water, mud or other detrimental substances and present a clean, neat arrangement.

The rim *b* is shown in Fig. 1 with a screw thread provided in a depressed portion at the center for the reception of a metal valve tube *h*, provided with cap *i* and an interior valve (not shown) of any usual or preferred construction. The depression not only produces round corners of the rim where the valve tube enters but throws the metal into position, properly to receive a long thread that will positively be air tight and of cheap light construction. This valve tube *h* may be removed leaving an ordinary valve hole through the rim *b* and felly *c*, if it is preferred to use a removable air tube as is common in double tube tires. My preferred construction, however, is to line the tire with a layer of rubber of sufficient thickness to retain the air without the use of the removable inner tube, for when the locking tubes *e e* are inflated, this rubber lining shown at *j* Fig. 1. is forced against the metal *b* with ample pressure to render the joint air tight, and thus make an air retaining space, bounded by the tire and rim *b*. The advantage of this construction is that a puncturing point as a tack protruding through the tread of the tire, on sufficient depression to strike the rim, cannot puncture the inner side of the air tube, as is common with present constructions, but strikes the metal rim where it can do no damage. If therefore, the tire is run deflated more or less distance before discovery, no damage is likely to result. Also if the tire is run deflated the flat rim *b* offers a large bearing surface for the tread of the tire, and thus carries the load without damage to either the tread or the rim, whereas with usual constructions the load of necessity is supported by the edges of a metal rim, frequently so sharp as to cut or pinch that portion of the tread coming against them and thus destroying the tire in a short distance, often before the lack of inflation is noticed. It is well known that running a double tire deflated, causes the loose inner tube to creep, due to its extension where compressed by the load, which compression and extension causes progression as the wheel revolves. This creeping either cuts off the valve stem of the air tube or else doubles the air tube in an irregular lump, where restricted from creeping, with damage both to air tube and tire. It is further well known that since the circumference of the tire is greater than the circumference of the rim *b*, usage deflated does not depress the circumferential portion of the tire radially, but tends to force the tire circumference against the rim *b* at some point coming in contact with the ground later than a radial point. This tends to produce creeping of the tire on its rim with the result that if the tire is fastened at several points and loose between, it will kink and be broken where fastened. My fastening is absolutely positive all around, so kinking and breaking is prevented. To provide however, for the circumferential portion of the tire, returning to its proper position after depression due to carrying the load, I preferably lubricate the inner surface of the tire and rim against which it bears, by providing some lubricant, preferably water, in the tire when inflated. dry lubricant such as powdered mica or graphite may be used with equally good success. These lubricants not only make the rubber of the inner surface of the tread portion slide easily on the metal and without damage, but they serve to retard the escape of the air in case of a small pucture such as is produced by a common pin or the thorn of cactus or Osage orange.

In case of puncture, a locking tube is deflated, and one side of the tire removed for a greater or less distance. The puncturing point, if present, is removed and a wire with small hook on the end is introduced through the puncture and out between the edge of the rim *b* and the removed portion of the edge *a*. To this wire a common large rubber patch may be hooked by the string provided in the patch for this purpose, and, rubber cement solution having been applied to the proper surface of the patch, it may be drawn into the puncture from the inside by withdrawing the wire. This leaves the large head of the patch on the inside with full assurance that the cement is where wanted and knowledge that the size of the head of the patch is such that it cannot be blown out through the puncture by the pressure of air in the tire. The tire edge may immediately be replaced and the locking tube *e* inflated followed by the inflation of the tire through its tube *h*. The locking tube being small is easily inflated but since many autos are now provided with power inflating pumps, this double inflation is no inconvenience, while the permanent repair of the tire as described, saves the cost and bother of carrying additional tires as is so common with their liability to damage by being carried and danger of being lost or stolen.

As a precaution against tire damage so disastrous that it cannot be repaired in the ordinary manner, an inner tube may be carried and inserted as before described by removing one edge *a* from the rim and unscrewing the valve tube *h*, into the hole of which the valve tube of the inner tube may be inserted and the tire treated as to repair, by wrapping exteriorly with tire tape or other material, as is frequently done with tires of common construction.

In Fig. 3, I have shown the metal ring on which the tire is preferably constructed. This ring is so shaped that the tire is held firmly against it when wrapped with cloth in the common manner known to tire makers and after vulcanizing, it is split along the base in the central plane of the metal ring so as to permit removal from the ring by separating the edges *a a* from each other. The use of a ring having a greater circumference than the outer circumference of the tire causes the rubber of the tread to be compressed both longitudinally and transversely by inflation, thus rendering it exceedingly difficult to puncture as is well known. This construction also leaves the fabric very loose in a circumferential direction and retains the air almost solely by the crosswise strength of the fabric, which secures the great receptivity and long life before mentioned. Of course this method of construction and fastening is applicable to tires without the interior rubber air retaining lining *j* as in the present day constructions.

I claim,

1. A pneumatic tire having thickened edges, in combination with a rim grooved along its sides and provided with inflatable tubes adapted to firmly lock the edges of the tire within the grooves.

2. In combination with a pneumatic tire, having thickened edges a metal rim cylindrical on the outside, grooves along each side of the wheel felly and inflatable tubes within the groove, said tubes being adapted to firmly force the thickened edges of the tire against the inner circumference of the metal rim.

3. In combination with a pneumatic tire having thickened edges, inflatable locking tubes and a wheel felly grooved along its sides and provided with a metal rim and side flanges, so shaped and placed as to form grooves of a cross section larger than the opening between a flange and rim and adapted to receive the thickened edges of the tire.

4. In combination with a pneumatic tire having thickened edges and a metal rim, cylindrical outside and provided with inwardly turned beads, a wooden felly grooved along its outer edges and provided with flanges along its sides, and inflatable tubes held by said flanges.

5. In combination with a pneumatic tire having thickened edges, inflatable locking tubes and a grooved felly adapted to receive said edges and tubes and provided with valve holes for the inflation of the locking tubes and for the inflation of the tire.

6. In combination with a wooden felly provided with side flanges and a metal rim combining to form grooves along the sides thereof, a pneumatic tire having edges adapted to be locked in said grooves and inflatable tubes locking said tire in said grooves, said tire being constructed of larger circumference than it is after inflation, so as to be free from longitudinal strain when inflated.

7. In combination with a metal rim and a pneumatic tire arranged to form an air tight engagement with the edges of said rim, inflatable tubes adapted to firmly lock the edges of said tire against said metal rim a valve tube for inflation purposes engaged with said rim and adapted to be removed to admit the valve tube of an inner separate air tube.

In testimony whereof I affix my signature, in presence of two witnesses.

CHARLES E. DURYEA.

Witnesses:
  Lizzie E. Klopp,
  Sue E. Conner.